3,793,320
BASICALLY SUBSTITUTED (1H,3H)-QUINAZOLINE-2-THION-4-ONE DERIVATIVES

Rudi Beyerle, Bruchkobel, and Adolf Stachel, deceased, late of Frankfurt am Main-Fechenheim, Germany, by Ingeburg Lydia Katharina Stachel, heiress, Frankfurt am Main-Fechenheim, Rolf-Eberhard Nitz, Bergen-Enkheim, and Josef Scholtholt, Frankfurt am Main-Fechenheim, Germany, assignors to Cassella Farbwerke Mainkur Aktiengesellschaft, Frankfurt am Main-Fechenheim, Germany
No Drawing. Filed Oct. 7, 1971, Ser. No. 187,562
Claims priority, application Germany, Oct. 15, 1970,
P 20 50 640.5
Int. Cl. C07d 87/46
U.S. Cl. 260—247.1          8 Claims

ABSTRACT OF THE DISCLOSURE

The present invention relates to new, pharmacologically valuable, basically substituted (1H,3H) - quinazoline-2-thion-4-one derivatives having the general formula

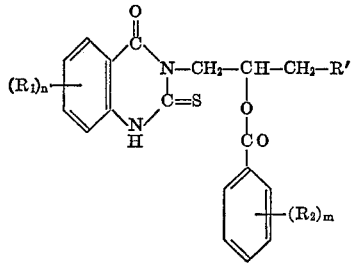

wherein:

R' means a radical selected from the group consisting of secondary aliphatic, cycloliphatic and araliphatic amines having 2–10 carbon atoms and 5, 6 or 7-membered heterocyclic nitrogen bases containing, in addition to the nitrogen atom, a corresponding number of methylene groups as well as an additional nitrogen atom, a O or an S atom, said radical being bound via a nitrogen atom;
$R_1$ stands for a lower alkoxy group having 1–4 carbon atoms which are preferably in the 6,7 or 6,7,8-position;
$R_2$ stands for alkoxy groups having 1–4 carbon atoms;
$m$ stands for an integer selected from the group 1, 2 and 3; and
$n$ stands for an integer selected from the group 2 and 3; and to a process of producing said derivatives by acylating, optionally in the presence of an acid-binding agent, (1H,3H)-quinazoline-2-thion-4-one derivatives of the general formula

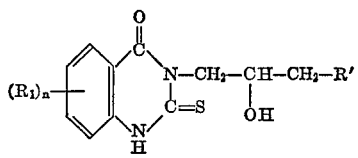

wherein R', $R_1$ and $n$ have the above given meanings, with an alkoxy benzoic acid of the general formula

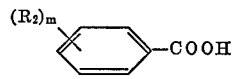

wherein $R_2$ and $m$ have the meanings set out hereinbefore, or a functional derivative thereof.

---

The present invention relates to basically substituted (1H,3H)-quinazoline-2-thion-4-one derivatives having the general formula

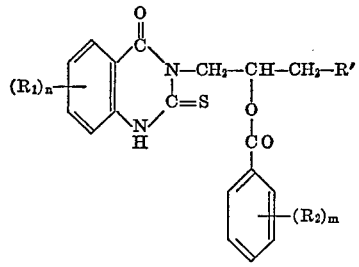

wherein:

R' means a radical selected from the group consisting of secondary aliphatic, cycloaliphatic and araliphatic amines having 2–10 carbon atoms and 5, 6 or 7-membered heterocyclic nitrogen bases containing in addition to the nitrogen atom a corresponding number of methylene groups, as well as an additional nitrogen atom, an O or an S atom, said radical being bound via a nitrogen atom;
$R_1$ stands for a lower alkoxy group having 1–4 carbon atoms which are preferably in the 6,7 or 6,7,8-position;
$R_2$ stands for alkoxy groups having 1–4 carbon atoms;
$m$ stands for an integer selected from the group 1, 2 and 3; and
$n$ stands for an integer selected from the group 2 and 3.

Apart from the new (1H,3H)-quinazoline-2-thion-4-one derivatives defined hereinbefore the present invention relates to a process for their manufacture. This process is characterized by acylating, optionally in the presence of an acid-binding agent, (1H,3H)-quinazoline-2-thion-4-one derivatives of the general formula

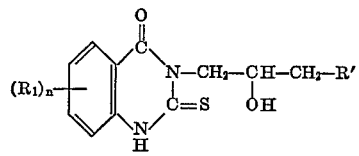

wherein R', $R_1$ and $n$ have the above given meanings, with an alkoxy benzoic acid of the general formula

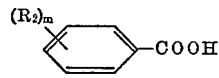

wherein $R_2$ and $m$ have the meanings set out hereinbefore, or a functional derivative thereof.

The 3-(γ-amino-β-hydroxypropyl)-(1H,3H)-quinazoline-2-thion-4-ones required as starting material are prepared analogously to the description given in the Journal Helvetia Chimica Acta 50 (1967), 1440, by reacting the correspondingly substituted o-alkoxy-carbonyl-phenylisothiocyanates with 3-γ-amino-β-hydroxy-propylamines.

The (1H,3H)-quinazoline-2-thion-4-one derivatives according to the present invention are valuable pharmaceuticals. In particular, they are excellent coronary dilators and, in this respect, superior to other known substances of this kind.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schaper, R. Xhonneux, and J. M. Bogaard "Über die Kontinuierliche Messung des Sauerstoffdruckes im Venösen Coronarblut" (Naunyn-Schmiedeberg's Arch. exp. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Lüebbers "Die Messung des Sauerstoffdruckes in Gasen und Flüssigkeiten mit der Platin-Elektrode unter Besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective hydrochlorides:

For the preparation of the injection solutions the hydrochlorides of the quinazoline derivatives are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying example which is of an illustrative rather than a limiting nature. Unless otherwise stated, all temperatures given are in degrees centigrade.

EXAMPLE 39.7 g. (0.1 mol) 3-(γ-diethylamino-β-hydroxypropyl)-6,7,8 - trimethoxy-(1H,3H)-quinazoline-2-thion-4-one are dissolved in 250 cc. chloroform and admixed with 11.1 g. (0.11 mol) triethylamine. Subsequently, while stirring at room temperature, a solution consisting of 25.3 g. (0.11 mol) 3,4,5-trimethoxybenzoyl chloride in 80 cc. chloroform is added dropwise during 30 minutes and stirring is continued for one hour at room temperature. The reaction mixture is heated to the boil and stirred for 6 hours under reflux. After cooling down it is evaporated to dryness in vacuo. The residue is dissolved with stirring in dilute hydrochloric acid and the thusly obtained solution is filtered so as to become limpid. The aqueous hydrochloric acid solution is then rendered alkaline by the addition of aqueous sodium hydroxide solution and the oily, separating reaction product is dissolved in ethyl acetate. After drying over potassium carbonate, one obtains by the introduction of anhydrous gaseous hydrogen chloride into the ethyl acetate solution the hydrochloride of the 3-[γ-diethylamino-β-(3,4,5-trimethoxybenzoxy) - propyl]-6,7,8-trimethoxy-(1H,3H)-quinazoline - 2 - thion-4-one in the form of colorless needles melting at 154–156°. Yield: 43 g. (=68.5% of the theoretical).

The 3-(γ-diethylamino-β-hydroxypropyl) - 6,7,8 - trimethoxy-(1H,3H)-quinazoline - 2 - thion-4-one required as starting material may be prepared as follows:

28.3 g. (0.1 mol) 2,3,4 - trimethoxy-6-methoxy-car-

| Preparation | LD 50, g./kg., mouse i.v. | Dosage, mg./kg., i.v. | Maximal increase in oxygen tension in the coronary veinous blood in— | | Maximal change in— | | | |
|---|---|---|---|---|---|---|---|---|
| | | | | | The heart rate in— | | The blood pressure (systolic/diastolic) in— | |
| | | | Percent | Minutes | Percent | Minutes | Percent | Minutes |
| 3-[γ-diethylamino-β-(3,4,5-trimethoxybenzoxy)-propyl]-6,7,8-trimethoxy-(1H,3H)-quinazoline-2-thion-4-one | | 0.05 | +77 | 30 | +16 | 20 | −7/−14 | 2 |
| 3-[γ-di-n-propylamino-β-(3,4,5-trimethoxybenzoxy)-propyl]-6,7,8-trimethoxy-(1H,3H)-quinazoline-2-thion-4-one | | 0.05 | +46 | 50 | +25 | 10 | −5/±0 | 30 |
| 3-[γ-N-methyl-N-allylamino-β-(3,4,5-trimethoxybenzoxy)-propyl]-6,7,8-trimethoxy-(1H,3H)-quinazoline-2-thion-4-one | 0.15 | 0.05 | +75 | 55 | 0 | | −10/−12 | 55 |
| 3-[γ-N-methyl-N-benzylamino-β-(3,4,5-trimethoxybenzoxy)-propyl]-6,7,8-trimethoxy-(1H,3H)-quinazoline-2-thion-4-one | | 0.05 | +20 | 20 | +3 | 30 | 0 | |
| 3-[γ-N-ethyl-N-cyclohexylamino-β-(3,4,5-trimethoxybenzoxy)-propyl]-6,7,8-trimethoxy-(1H,3H)-quinazoline-2-thion-4-one | | 0.05 | +33 | 20 | +30 | 20 | −5/±0 | 3 |
| 3-[γ-pyrrolidino-β-(3,4,5-trimethoxybenzoxy)-propyl]-6,7,8-trimethoxy-(1H,3H)-quinazoline-2-thion-4-one | | 0.05 | +33 | 45 | +10 | 20 | −11/±0 | 45 |
| 3-[γ-piperidino-β-(3,4,5-trimethoxybenzoxy)-propyl]-6,7,8-trimethoxy-(1H,3H)-quinazoline-2-thion-4-one | | 0.1 | +50 | 20 | +8 | 20 | 0 | |
| 3-[γ-morpholino-β-(3,4,5-trimethoxybenzoxy)-propyl]-6,7,8-trimethoxy-(1H,3H)-quinazoline-2-thion-4-one | | 0.05 | +110 | 50 | +14 | 45 | −15/−14 | 10 |
| 3-[γ-(N'-(3,4-dimethoxybenzyl)-piperazino]-β-(3,4,5-trimethoxybenzoxy)-propyl]-6,7,8-trimethoxy-(1H,3H)-quinazoline-2-thion-4-one | 0.155 | 0.1 | +65 | >45 | +5 | 45 | −12/−15 | 40 |
| 3-[γ-(N'-p-chlorophenylpiperazino)-β-(3,4,5-trimethoxybenzoxy)-propyl]-6,7,8-trimethoxy-(1H,3H)-quinazoline-2-thion-4-one | | 1.0 | +24 | 30 | 0 | | 0 | |
| 3-[γ-diethylamino-β-(3,4,5-trimethoxybenzoxy)-propyl]-6,7-dimethoxy-(1H,3H)-quinazoline-2-thion-4-one | 0.069 | 0.1 | +55 | 20 | +15 | 15 | −12/−20 | 5 |
| 3-[γ-morpholino-β-(3,4,5-trimethoxybenzoxy)-propyl]-6,7-dimethoxy-(1H,3H)-quinazoline-2-thion-4-one | >0.25 | 0.1 | +60 | 20 | +15 | 35 | −5/−15 | 5 |
| 3-[γ-hexamethyleneimino-β-(3,4,5-trimethoxybenzoxy)-propyl]-6,7,8-trimethoxy-(1H,3H)-quinazoline-2-thion-4-one | 0.16 | 1.0 | +130 | 45 | +20 | 45 | −15/−6 | 45 |

In the preparation of dragées and tablets containing as essential active ingredient the quinazoline derivatives of our invention these substances may be admixed with the conventional solid tabletting adjuvants, such as starch, lactose, talc and the like. Any of the tabletting materials and carriers customary in pharmaceutical practice may be employed.

bonyl-phenylisothiocyanate, prepared by reacting analogously to the description given in "Journal of Organic Chemistry" 27 (1962), 3702 the methyl-3,4,5-trimethoxy anthranilate with thiophosgene, are dissolved in 200 cc. anhydrous diethyl ether and, while stirring at room temperature, admixed with a solution consisting of 14.6 g. (0.1 mol) γ-diethylamino-β-hydroxypropylamine in 60 cc.

anhydrous diethyl ether. Stirring is continued for 2 hours at room temperature, subsequently, the reaction product which separates in the form of crystals is sucked off and obtained is the 3-(γ-diethylamino-β-hydroxypropyl)-6,7,8-trimethoxy - (1H,3H) - quinazoline-2-thion-4-one in the form of colorless needles melting at 146°. Yield: 33 g. (=83% of the theoretical).

Analogously to the above process the following starting materials may be prepared:

General formula:

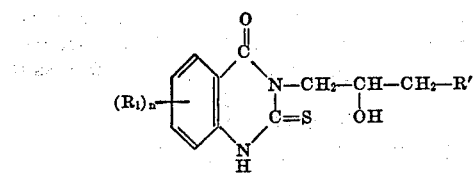

| $(R_1)_n$ | R' | M.P., deg. |
|---|---|---|
| 6,7-(OCH₃)₂ | —N(C₂H₅)₂ | 165–167 |
| 6,7-(OCH₃)₂ | -N⟨⟩O (morpholino) | 211–212 |
| 6,7,8-(OCH₃)₃ | —N(n-C₃H₇)₂ | 153–155 |
| 6,7,8-(OCH₃)₃ | —N(CH₃)—CH₂—CH=CH₂ | 137–138 |
| 6,7,8-(OCH₃)₃ | —N(CH₃)CH₂C₆H₅ | 113–114 |

TABLE—Continued

| $(R_1)_n$ | R' | M.P., deg. |
|---|---|---|
| 6,7,8-(OCH₃)₃ | —N(C₂H₅)—⟨cyclohexyl-H⟩ | 102–104 |
| 6,7,8-(OCH₃)₃ | -N⟨pyrrolidino⟩ | 190 |
| 6,7,8-(OCH₃)₃ | -N⟨piperidino⟩ | 189–191 |
| 6,7,8-(OCH₃)₃ | -N⟨morpholino⟩ | 173 |
| 6,7,8-(OCH₃)₃ | -N⟨piperazino⟩-N—CH₂—⟨C₆H₃(OCH₃)₂⟩ | 157–159 |
| 6,7,8-(OCH₃)₃ | -N⟨piperazino⟩-N—⟨C₆H₄—Cl⟩ | 218–221 |
| 6,7,8-(OCH₃)₃ | -N⟨hexamethyleneimino⟩ | 172 |

Analogously to the description given in para 1 of this example, the following compounds of the present invention are prepared from the above starting materials:

General formula:

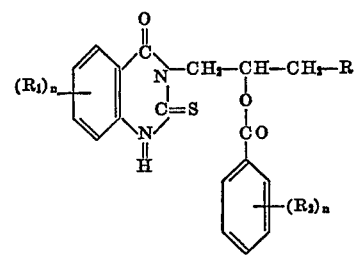

| $(R_2)_n$ | $(R_1)_n$ | R | M.P. degree (hydrochloride) |
|---|---|---|---|
| 3,4,5-(OCH₃)₃ | 6,7-(OCH₃)₂ | —N(C₂H₅)₂ | ¹130 |
| 3,4,5-(OCH₃)₃ | 6,7-(OCH₃)₂ | -N⟨⟩O | 156 |
| 3,4,5-(OCH₃)₃ | 6,7,8-(OCH₃)₃ | —N(n-C₃H₇)₂ | 119 |
| 3,4,5-(OCH₃)₃ | 6,7,8-(OCH₃)₃ | —N(CH₃)CH₂—CH=CH₂ | ¹75 |
| 3,4,5-(OCH₃)₃ | 6,7,8-(OCH₃)₃ | —N(CH₃)CH₂C₆H₅ | 130 |
| 3,4,5-(OCH₃)₃ | 6,7,8-(OCH₃)₃ | —N(C₂H₅)—⟨H⟩ | 179 |
| 3,4,5-(OCH₃)₃ | 6,7,8-(OCH₃)₃ | -N⟨pyrrolidino⟩ | 156–160 |
| 3,4,5-(OCH₃)₃ | 6,7,8-(OCH₃)₃ | -N⟨piperidino⟩ | 203 |
| 3,4,5-(OCH₃)₃ | 6,7,8-(OCH₃)₃ | -N⟨morpholino⟩ | 138–140 |
| 3,4,5-(OCH₃)₃ | 6,7,8-(OCH₃)₃ | -N⟨piperazino⟩-N—CH₂—⟨C₆H₃(OCH₃)₂⟩ | 260 |
| 3,4,5-(OCH₃)₃ | 6,7,8-(OCH₃)₃ | -N⟨piperazino⟩-N—⟨C₆H₄—Cl⟩ | 177–180 |
| 3,4,5-(OCH₃)₃ | 6,7,8-(OCH₃)₃ | -N⟨hexamethyleneimino⟩ | 163 |

¹ Decomposes.

What is claimed is:
1. A compound of the formula

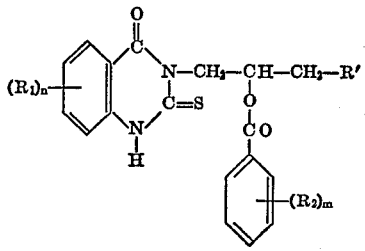

wherein:
R' is a radical selected from the group consisting of morpholino, piperidino, pyrrolidino and hexamethyleneimino;
$R_1$ is an alkoxy group having 1-4 carbon atoms attached to positions 6, 7 or 6, 7, 8;
$R_2$ is an alkoxy group having 1-4 carbon atoms;
$m$ is an integer selected from the group consisting of 1, 2 and 3;
$n$ is an integer selected from the group consisting of 2 and 3; or the pharmaceutically acceptable salts thereof.
2. A compound according to claim 1, wherein $R_1$ is the methoxy group.
3. A compound according to claim 1, wherein $R_2$ is the methoxy group.
4. 3-[γ-pyrrolidino - β - (3,4,5-trimethoxybenzoxy)-propyl]-6,7,8-trimethoxy-(1H,3H)-quinazoline - 2 - thion-4-one, or the pharmaceutically acceptable salts thereof.
5. 3-[γ-piperidino - β - (3,4,5-trimethoxybenzoxy)-propyl]-6,7,8-trimethoxy-(1H,3H)-quinazoline - 2 - thion-4-one, or the pharmaceutically acceptable salts thereof.
6. 3-[γ-morpholino-β-(3,4,5 - trimethoxybenzoxy)-propyl]-6,7,8-trimethoxy - (1H,3H) - quinazoline-2-thion-4-one, or the pharmaceutically acceptable salts thereof.
7. 3-[γ-morpholino-β-(3,4,5-trimethoxybenzoxy) - propyl]-6,7-dimethoxy - (1H,3H) - quinazoline-2-thion - 4-one, or the pharmaceutically acceptable salts thereof.
8. 3-[γ-hexamethyleneimino - β - (3,4,5 - trimethoxybenzoxy) - propyl]-6,7,8-trimethoxy-(1H,3H)-quinazoline-2-thion-4-one, or the pharmaceutically acceptable salts thereof.

References Cited
UNITED STATES PATENTS
3,296,447  1/1967  Papesch _____ 260—256.4

HENRY R. JILES, Primary Examiner
G. T. TODD, Assistant Examiner

U.S. Cl. X.R.
260—256.5 R; 424—248, 251